United States Patent
Shimozono

(10) Patent No.: US 9,594,796 B2
(45) Date of Patent: Mar. 14, 2017

(54) STORAGE APPARATUS AND DATA MANAGEMENT METHOD

(71) Applicant: Hitachi, Ltd., Tokyo (JP)

(72) Inventor: Norio Shimozono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/358,860

(22) PCT Filed: May 23, 2013

(86) PCT No.: PCT/JP2013/064369
§ 371 (c)(1),
(2) Date: May 16, 2014

(87) PCT Pub. No.: WO2014/188560
PCT Pub. Date: Nov. 27, 2014

(65) Prior Publication Data
US 2016/0092490 A1    Mar. 31, 2016

(51) Int. Cl.
*G06F 17/00* (2006.01)
*G06F 17/30* (2006.01)
*G06F 3/06* (2006.01)

(52) U.S. Cl.
CPC ........ *G06F 17/30371* (2013.01); *G06F 3/067* (2013.01); *G06F 3/0608* (2013.01); *G06F 3/0652* (2013.01); *G06F 17/30876* (2013.01)

(58) Field of Classification Search
CPC ......... G06F 17/30371; G06F 17/30876; G06F 3/0608; G06F 3/0652
USPC ......................................... 707/662, 663, 688
See application file for complete search history.

(56) References Cited

U.S. PATENT DOCUMENTS

| | | | |
|---|---|---|---|
| 7,171,532 B2* | 1/2007 | Kodama | G06F 3/0626 709/203 |
| 9,135,116 B1* | 9/2015 | Balasubramanian | G06F 11/1435 707/812 |
| 2006/0047923 A1* | 3/2006 | Kodama | G06F 3/0626 711/161 |
| 2012/0221773 A1* | 8/2012 | Shuto | G06F 11/1068 711/103 |
| 2014/0115108 A1* | 4/2014 | Zhang | H04L 41/5048 709/217 |

FOREIGN PATENT DOCUMENTS

| | | |
|---|---|---|
| JP | 05-210546 A | 8/1993 |
| JP | 2008-123053 A | 5/2008 |
| JP | 2012-088875 A | 5/2012 |

* cited by examiner

*Primary Examiner* — Phong Nguyen
(74) *Attorney, Agent, or Firm* — Mattingly & Malur, PC

(57) ABSTRACT

A storage apparatus and data management method capable of utilizing storage resources effectively is proposed. A storage apparatus storing primary data and analysis data obtained based on the primary data as a result of the execution of specified analysis processing by an external computing system is designed so that metadata of the analysis data includes regeneratable attribute information indicating whether or not the corresponding analysis data can be regenerated by means of the analysis processing by the external computing system; and a control unit regularly or irregularly selects the analysis data, which satisfies a specified condition and can be regenerated, based on the metadata for each piece of the analysis data and deletes the selected analysis data from one or more storage devices.

4 Claims, 14 Drawing Sheets

FIG.5

| | | |
|---|---|---|
| USER NAME | XXX_Corp | 54A |
| AUTOMATIC DELETION FLAG | VALID | 54B |
| TEMPORARY DELETION NO-ACCESS TIME THRESHOLD | 7 MONTHS | 54C |
| COMPLETE DELETION NO-ACCESS TIME THRESHOLD | 15 MONTHS | 54D |
| REGENERATION TIME UPPER LIMIT VALUE | 6 HOURS | 54E |
| ACTUAL CAPACITY | 35TB | 54F |
| VIRTUAL CAPACITY | 280TB | 54G |

54

| SOURCE DIRECTORY | SalesData/Jan2011/Prog/Script | ~70A |
| OUTPUT DIRECTORY | SalesAnalysis/2011/ | ~70B |
| SOURCE SYMBOLIC LINK | Input/SalesData/Input/Prog/Input/Script/ | ~70C |
| OUTPUT SYMBOLIC LINK | Output/ | ~70D |
| EXECUTION SCRIPT | Script/analyze.sh | ~70E |

STORAGE APPARATUS AND DATA MANAGEMENT METHOD

TECHNICAL FIELD

The present invention relates to a storage apparatus.

BACKGROUND ART

Recently, a technique called big data analysis to create new values by analyzing an enormous amount of data relating to the social infrastructure such as social working services, finance, medical services, and traffic has been being put into practical use.

Regarding the big data analysis, capacities of both input data collected from the social infrastructure and output data which are analysis results are very large and such capacities as well as time continue to increase.

For example, this problem is apparent when the big data analysis is performed by using a cloud service. Computation resources for the cloud service are calculated based on performance and operating time of computers and storage resources are often calculated based on a data capacity and a recording time period. Accordingly, as the data capacity expands, usage fees for the storage resources become dominant over those for the computation resources with respect to the total cost. Therefore, when the big data analysis is performed by using the cloud service, the usage cost of the cloud service becomes enormous.

As a technique to inhibit an increase of data capacity in a storage apparatus, there is a technique called information life cycle management (ILM: Information Lifecycle Management) to migrate low-value data to an inexpensive device or delete such data based on time elapsed from the generation of the data or access frequency to the data (see Patent Literature 1).

CITATION LIST

Patent Literature

Patent Literature 1 U.S. Pat. No. 7,171,532

SUMMARY OF INVENTION

Problems to be Solved by the Invention

The ILM can inhibit an increase of the capacity by deleting data, but whether the data is regeneratable or not is unclear. So, it is difficult to judge whether data may be deleted or not and the problem is that the data cannot be deleted until the above judgment is decided.

Means for Solving the Problems

In order to solve the above-described problem, the present invention provides a storage apparatus for: selecting analysis data, which satisfies a specified condition and can be regenerated, based on regeneratable attribute information indicating whether the analysis data obtained by executing specified processing on primary data can be regenerated or not; and deleting the selected analysis data.

Advantageous Effects of Invention

Whether data can be restored or not can be determined for each piece of data according to the present invention, so that the restorable data can be deleted selectively.

BRIEF DESCRIPTION OF DRAWINGS

FIG. 5 is a conceptual diagram illustrating the structure of a user information table.

DESCRIPTION OF EMBODIMENTS

An embodiment of the present invention will be explained below in detail with reference to the relevant drawings.

Figure 14:
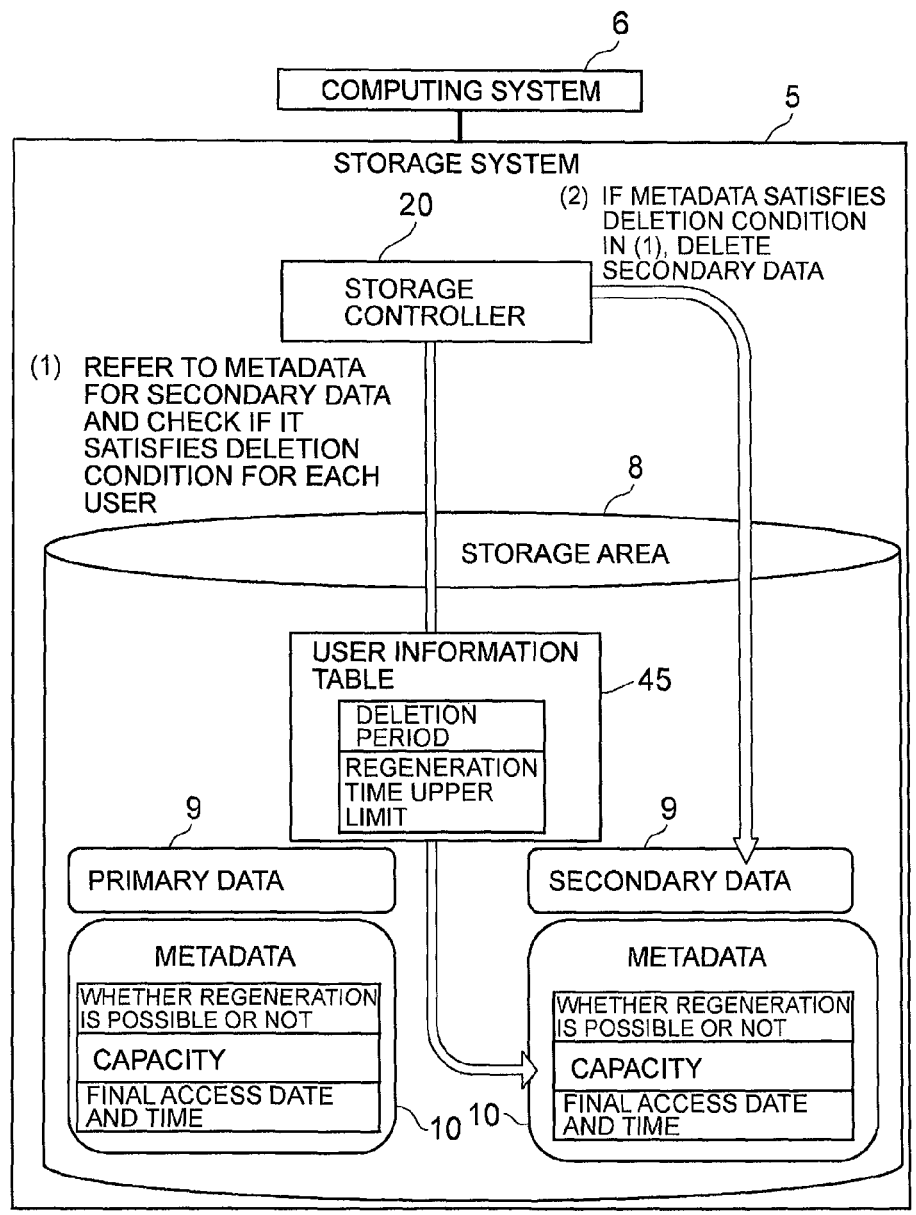
FIG. 14 is a conceptual diagram illustrating the outline of this embodiment.

FIG. 14 illustrates the outline of this embodiment. A storage area 8 of a storage system 5 stores primary data 9 and secondary data 9 introduced from a computing system 6 based on the primary data 9. Each of the primary data 9 and the secondary data 9 stores metadata 10 appurtenant to the above data. The metadata 10 stores, for example, whether regeneration is possible or not, the capacity of data, and a final access date and time. Moreover, the storage area stores a user management table. A user information table 45 stores information such as a deletion period which is a target to be deleted when data is not accessed after that period, and an upper limit time which may be used as regeneration time.

A storage controller 20 monitors the metadata 10, compares the user information table 45 with the metadata 10, and judges whether the metadata 10 satisfies a deletion condition or not. For example, the storage controller 20 judges whether the metadata 10 of the secondary data 9 can be regenerated or not. Furthermore, the storage controller 20 may judge whether a period of time elapsed after the final access date and time exceeds the deletion period or not, or whether time required for regeneration time exceeds the regeneration upper limit time or not. If it is determined as a result of the judgment that the deletion condition described in the user information table 45 is satisfied, the storage controller 20 deletes the secondary data 9.

Since whether data can be restored or not can be judged with respect to each piece of data according to this embodiment, the restorable data can be deleted selectively. As a result, an amount of data to be saved can be reduced efficiently against the growth of the data amount due to, for example, the big data analysis. As a result, it is possible to reduce cost for storage media for data storage. Moreover, since data is deleted automatically, it is possible to reduce the administrator's burden. In this way, management cost can be reduced. Particularly, with respect to a cloud service, a necessary storage capacity to provide the service decreases, so that a cloud vendor can provide users with storage areas with good cost performance. The users can use the cloud service at low cost.

(1) Configuration of Data Analysis System According to this Embodiment

Figure 1:
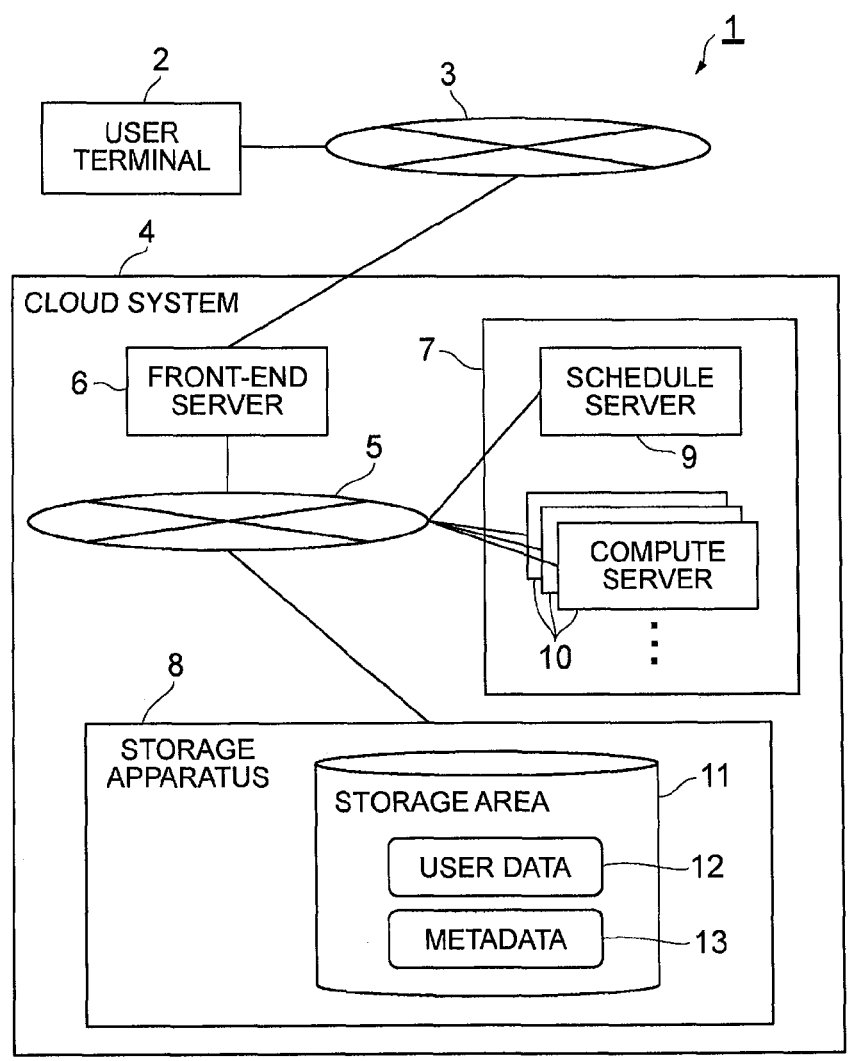
FIG. 1 is a block diagram illustrating an overall configuration of a data analysis system according to this embodiment.

Referring to FIG. 1, reference numeral 1 represents a data analysis system according to this embodiment as a whole. This data analysis system 1 is configured so that one or more user terminals 2 are connected via the Internet 3 to a cloud system 4.

The user terminal 2 is a computer device used by a user of a data analysis service described later and is composed of, for example, a personal computer. Analysis target data and various commands such as analysis requests are sent from the user terminal 2 via the Internet 3 to the cloud system 4.

The cloud system 4 is an information processing system for storing data sent from the user terminal 2 and providing the data analysis service to analyze the stored data and is configured by including a front-end server 6, a computing system 7, and a storage apparatus 8 which are connected to each other via an internal network 5.

The front-end server 6 is a server system connected to the Internet 3 and executes user authentication processing and reception processing for accepting various commands and analysis target data sent from the user terminal 2.

The computing system 7 is a system for executing computation jobs according to job commands sent from the user terminal 2 and includes a schedule server 9 and one or more compute servers 10.

The schedule server 9 is a computer for managing the order of executing job commands from the user terminal 2 and executing preprocessing and post-processing for computation. Moreover, the compute server 10 is a computer for executing designated job programs according to commands from the schedule server 9 and executing necessary computation processing.

The storage apparatus 8 is a storage device which provides a storage area 11, and user data 12 and metadata 13 are stored in this storage area. The user data is a data recording unit in the storage apparatus 8 and includes, for example, analysis target data sent from the user terminal 2 (primary data), programs, and script files. Analysis result data calculated based on the primary data such as secondary data calculated by using the primary data and tertiary data calculated by using that secondary data (hereinafter collectively referred to as the analysis data) are also included in this user data 12. The metadata 13 has a data structure for storing management information about the secondary and subsequent user data (that is, the analysis data).

Figure 2:
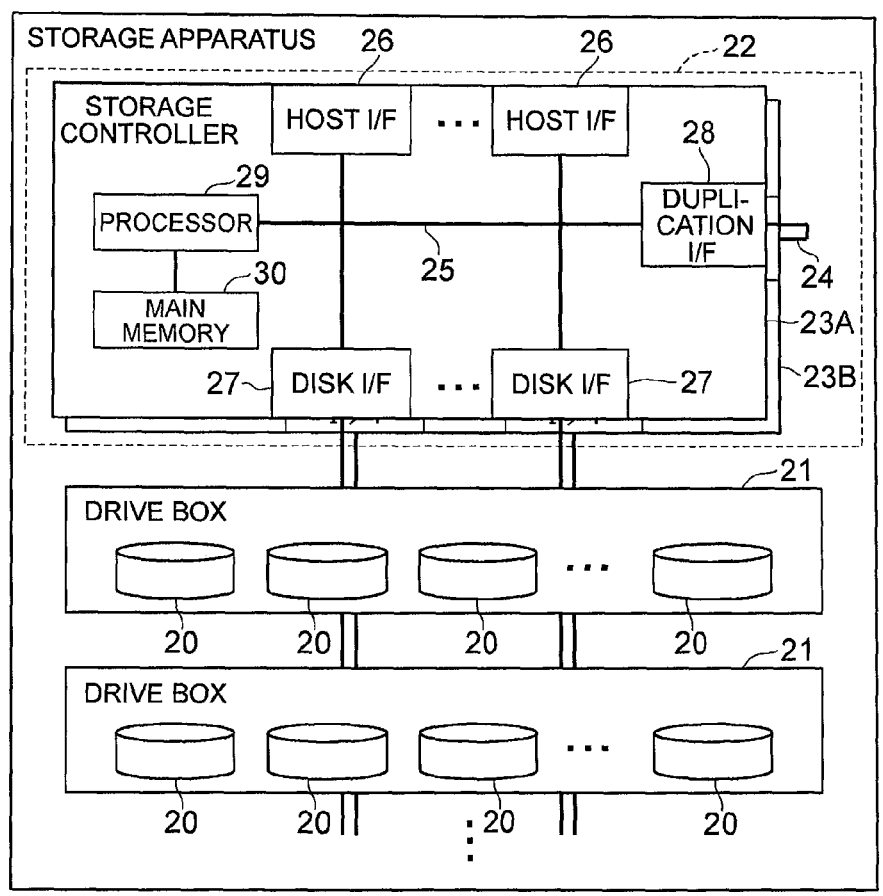
FIG. 2 is a block diagram illustrating a hardware configuration of a storage apparatus.

FIG. 2 illustrates a specific configuration of the storage apparatus 8. As is apparent from FIG. 2, the storage apparatus 8 is composed of one or more drive boxes 21, each of which stores one or more storage devices 20, and a control unit 22 for controlling inputting/outputting of data to/from the storage device(s) 20.

The storage devices 20 are composed of, for example, expensive disks such as SAS (Serial Attached SCSI) disks, inexpensive disks such as SATA (Serial AT Attachment) disks, or semiconductor memories such as SSDs (Solid State Drives). One or more storage devices 20 are managed as one RAID (Redundant Arrays of Independent Disks) group and one or more logical volumes are set in physical areas provided by each of the storage devices 20 constituting one RAID group. Then, the user data 12 and the metadata 13 described above with reference to FIG. 1 are stored in block units of specified size (hereinafter referred to as the logical blocks) in the logical volume.

The control unit 22 is configured by including storage controllers 23A, 23B for system 0 and system 1. The storage controllers 23A, 23B for system 0 and system 1 are connected via an inter-controller connecting path 24 composed of, for example, a bus in accordance with PCI (Peripheral Component Interconnect)-Express Standards and various data and commands are sent and received via this inter-controller connecting path 24 between the storage controllers 23A, 23B for system 0 and system 1.

Each storage controller 23A, 23B includes one or more host interfaces 26, one or more disk interfaces 27, a duplication interface 28, a processor 29, and a main memory 30 connected to the processor 29, which are connected to each other via an internal bus 25.

The host interface 26 is an interface for connecting the storage apparatus 8 to the internal network 5 (FIG. 1) and executes protocol conversion processing when communicating with the front-end server 6, the schedule server 9, and the compute server 10. Moreover, the disk interface 27 is an interface for communicating with the storage device(s) 20 and executes the protocol conversion processing when communicating with the storage device(s) 20. The duplication interface 28 is an interface for communicating with the storage controller 23B, 23A for the other system via the inter-controller connecting path 24.

The processor 29 has a function controlling the operation of the entire storage apparatus 8 and is composed of, for example, a CPU (Central Processing Unit) and an MPU (Micro-Processing Unit). Moreover, the main memory 30 is composed of a semiconductor memory and is used to store various programs and various data. Programs stored in a specified logical volume are read to the main memory 30 at the time of activation of the storage apparatus 8 and the processor 29 executes such programs, thereby executing various processing as the entire storage apparatus 8.

(2) Software Configuration and Data Structure of Storage Apparatus

Next, a data management function of the storage apparatus 8 according to this embodiment will be explained. The storage apparatus 8 is equipped with the data management function that: deletes analysis data, which satisfies a specified condition and can be regenerated, from the user data 12 stored in the storage apparatus 8; and requests the computing system 7 to regenerate the analysis data, in response to a regeneration command which is targeted on the deleted analysis data and is issued from the user terminal 2, and sends the regenerated analysis data to the user terminal 2.

Figure 3:
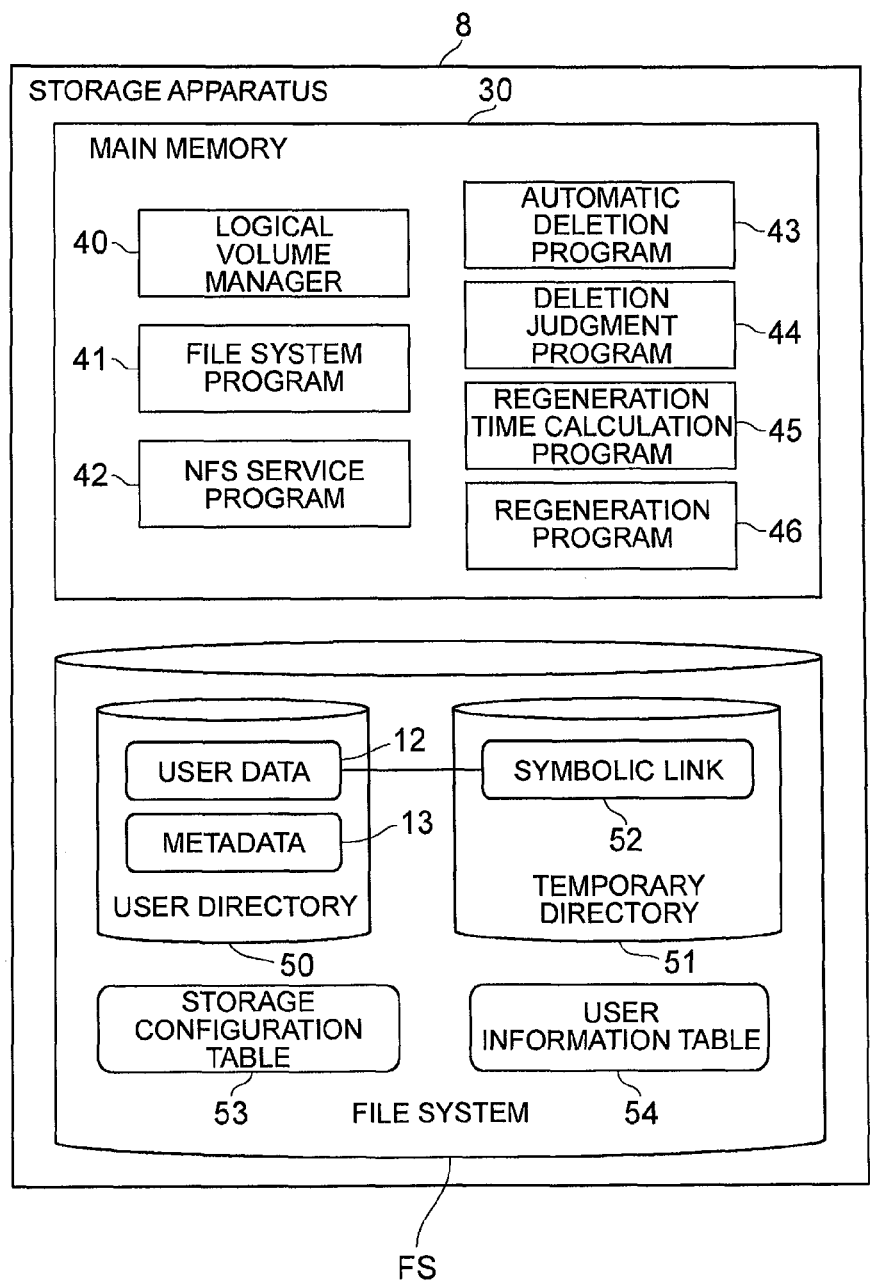
FIG. 3 is a block diagram illustrating a software configuration of the storage apparatus.

As a means for realizing the data management function according to this embodiment, the main memory 30 for the storage apparatus 8 stores, in addition to a logical volume manager program 40, a file system program 41, and an NFS (Network File System) service program 42, an automatic deletion program 43, a deletion judgment program 44, a regeneration time calculation program 45, and a regeneration program 46 as shown in FIG. 3.

The logical volume manager program 40 is a program for creating a logical volume(s) in storage areas provided by one or more storage devices 20 constituting a RAID group as described earlier and the file system program 41 is a program for constructing a file system FS in a logical volume. Moreover, the NFS service program 42 is a program for providing the front-end server 6, the schedule server 9, or the compute server 10 with a service enabling access to the file system FS constructed by the file system program 41.

On the other hand, the automatic deletion program 43 is a program having a function that automatically deletes the analysis data which is stored in the storage apparatus 8, satisfies a specified condition, and can be regenerated. Incidentally, in a case of this embodiment, the following two modes are prepared as an operation mode to delete the analysis data: a temporary deletion mode to delete only the analysis data which is a target; and a complete deletion mode to delete not only the target analysis data, but also the metadata 13 of that analysis data. Which operation mode is used to delete the analysis data is decided based on time during which that analysis data is not accessed (hereinafter referred to as the no-access time).

Moreover, the deletion judgment program 44 is a program having a function judging whether the analysis data can be deleted or not. Whether the analysis data can be deleted or not is judged based on, for example, the no-access time of the target analysis data and time required to regenerate that analysis data.

The regeneration time calculation program 45 is a program having a function calculating time required by the regeneration program 46 to regenerate the target analysis data. When the deletion judgment program 44 judges as described above whether the target analysis data can be deleted or not, the time required to regenerate the analysis data is used as one of judgment materials. So, when the deletion judgment program 44 judges whether the target analysis data can be regenerated or not, it requests the regeneration time calculation program 45 to calculate the time required to regenerate the analysis data.

Furthermore, the regeneration program 46 is a program having a function regenerating the analysis data deleted by the automatic deletion program 43. When a regeneration command to regenerate the analysis data deleted by the automatic deletion program 43 is issued from the user terminal 2 to the storage apparatus 8, the regeneration program 46 requests the schedule server 9 (FIG. 1) to regenerate the analysis data and, as a result, the compute server 10 regenerates the analysis data. The completion of the regeneration processing is reported to the front-end server 6, and the front-end server 6 notifies the user terminal 2 that the analysis data can now be accessed.

On the other hand, a user directory 50 and a temporary directory 51 are provided in the file system FS created by the file system program 41.

The user directory 50 is a directory for storing each user's user data 12 (including the analysis data) and the metadata 13; and the user data 12 and the metadata 13 are stored in a file or directory format. The metadata 13 is created for each directory of the analysis data and includes various necessary information for controlling the automatic deletion processing described later. The details of the metadata 13 will be explained later.

The temporary directory 51 is a directory for the compute server 10 (FIG. 1) to access part of the user data 12 via the NFS service program 42. A symbolic link 52 to the user data 12 is dynamically created in, or deleted from, this temporary directory 51 by the schedule server 9 as described later.

Furthermore, the file system FS stores a storage configuration table 53 and a user information table 54.

The storage configuration table 53 is a table used to manage necessary parameters when the automatic deletion program 43 executes processing for automatically deleting the analysis data which satisfies a specified condition and can be regenerated (hereinafter referred to as the automatic deletion processing) and when the regeneration program 46 executes processing for regenerating the deleted analysis data (hereinafter referred to as the regeneration processing).

Figure 4:
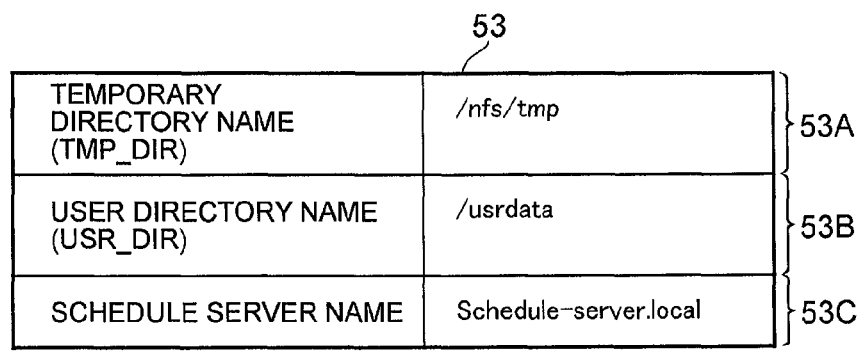
FIG. 4 is a conceptual diagram illustrating the structure of a storage configuration table.

This storage configuration table 53 is constituted from a temporary directory name row 53A, a user directory name row 53B, and a schedule server name row 53C as shown in FIG. 4. Then, the temporary directory name row 53A stores a directory name of the temporary directory 51 (FIG. 3) and the user directory name row 53B stores a directory name of the user directory 50 (FIG. 3). Moreover, the schedule server name row 53C stores a domain name or an IP address used for communication with the schedule server 9.

Furthermore, the user information table 54 is a table used to manage preset setting information for each user in relation to the automatic deletion processing described later and is created for each user. This user information table 54 is constituted from a user name row 54A, an automatic deletion flag row 54B, a temporary deletion no-access time threshold row 54C, a complete deletion no-access time threshold row 54D, a regeneration time upper limit value row 54E, an actual capacity row 54F, and a virtual capacity row 54G as shown in FIG. 5.

Then, the user name row 54A stores a user name of the relevant user and the automatic deletion flag row 54B stores a flag indicating whether or not the automatic deletion processing is to be executed on the analysis data of the relevant user (hereinafter referred to as the automatic deletion flag). Whether or not the automatic deletion processing is to be executed on the analysis data of the relevant user is set in advance by the user and a value of the automatic deletion flag corresponding to the setting result is set to the automatic deletion flag row 54B.

The temporary deletion no-access time threshold row 54C stores time which is set in advance as a threshold value of no-access time for the analysis data and is used when judging whether the target analysis data should be deleted in the aforementioned temporary deletion mode or not (hereinafter referred to as the temporary deletion no-access time threshold).

Moreover, the complete deletion no-access time threshold row 54D stores time which is set in advance as a threshold value of no-access time for the analysis data and is used when judging whether the then target analysis data should be deleted in the aforementioned complete deletion mode or not (hereinafter referred to as the complete deletion no-access time threshold).

Furthermore, the regeneration time upper limit value row 54E stores time which is set in advance by the user as an upper limit value (maximum value) of time required to regenerate the deleted analysis data which can be regenerated (hereinafter referred to as the regeneration time upper limit value).

Furthermore, the actual capacity row 54F stores a total capacity (total data amount) of the user data 12 of the relevant user, which is stored in the user directory 50 of the file system FS, and the virtual capacity row 54G stores a total capacity which is a sum of the total capacity of the relevant user's user data 12 and the capacity of the relevant user's analysis data deleted by the automatic deletion processing (hereinafter referred to as the virtual capacity). Accordingly, the difference between the virtual capacity and the capacity of the user data 12 is a capacity saved by the data management function according to this embodiment.

Figure 6:
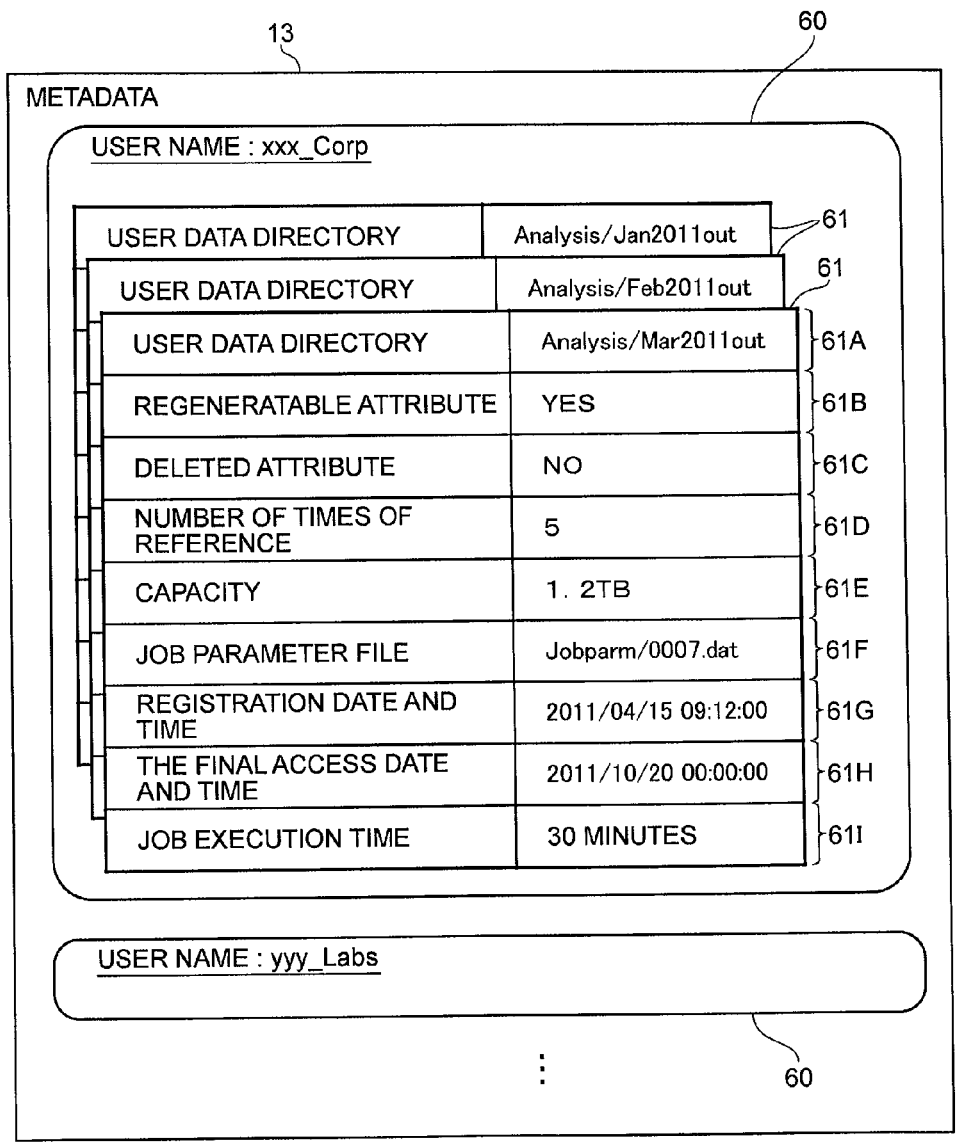
FIG. 6 is a conceptual diagram illustrating the structure of metadata.

Incidentally, a data configuration example of the metadata 13 according to this embodiment is illustrated in FIG. 6. As is apparent from FIG. 6, the metadata 13 has metadata repositories 60, each of which is for each user; and each of these metadata repositories 60 stores a metadata table 61 of the relevant user's analysis data. In this embodiment, the analysis data corresponds to the directory on a one-to-one basis, but it may correspond to files or a group of files.

The metadata table 61 is constituted from a user data directory row 61A, a regeneratable attribute row 61B, a deleted attribute row 61C, a number-of-times-of-reference row 61D, a capacity row 61E, a job parameter file row 61F, a registration date and time row 61G, a final access date and time row 61H, and a job execution time row 61I as shown in FIG. 6.

Then, the user data directory row 61A stores a storage location of the relevant analysis data and the regeneratable attribute row 61B stores information indicating the attribute of whether the relevant analysis data is regeneratable data or not (hereinafter referred to as the regeneratable attribute). If the relevant analysis data is data which cannot be regenerated, the regeneratable attribute is set as "NO"; and if the relevant analysis data is regeneratable data, the regeneratable attribute is set as "YES." This value is basically set as "YES" if the data is secondary or subsequent data; however, if the primary data which is the basis of the secondary or subsequent data is deleted and the relevant data can no longer be restored, the regeneratable attribute is set as "NO." In this embodiment, as a general rule, the primary data whose secondary data or subsequent data exists will not be deleted, so that the regeneratable attribute will not be changed from YES to NO. However, if the user arbitrarily deletes, for example, the primary data, the regeneratable attribute may be changed from "YES" to "NO." Furthermore, if the primary data can be restored reversibly from the secondary data, the restorable attribute of the primary data is set as "YES" when the secondary data is generated.

Moreover, the deleted attribute row 61C stores information indicating the attribute of whether the relevant analysis data has already been deleted or not (hereinafter referred to as the deleted attribute). If the relevant analysis data has already been deleted, the deleted attribute is set as "YES"; and if the relevant analysis data has not been deleted (is not deleted), the deleted attribute is set as "NO."

Furthermore, the number-of-times-of-reference row 61D stores the number of other analysis data required for regeneration of the analysis data and the capacity row 61E stores a data capacity (data size) of the relevant analysis data.

Furthermore, the job parameter file row 61F stores a storage location of a job parameter file described later in which necessary parameters to generate the relevant analysis data are stored (hereinafter referred to as the job parameter file), and the registration date and time row 61G stores a date and time when the relevant analysis data was registered in the user directory 50 (FIG. 3).

Furthermore, the final access date and time row 61H stores a date and time when the relevant analysis data was downloaded to the storage apparatus 8 or the analysis data was accessed by the compute server 10 (FIG. 1) last time.

Furthermore, the job execution time row 61I stores time required for the compute server 10 to generate (calculate) the relevant analysis data.

(3) Various Processing in Relation to Data Management Function According to this Embodiment Next, the processing content of various processing executed in relation to the data management function according to this embodiment will be explained. Incidentally, a processing subject of the various processing may sometimes be described as a "program" in the following explanation, but it is a matter of course that in practice, the processor 29 (FIG. 2) for the storage apparatus 8 executes that processing based on the program.

(3-1) Job Execution Processing

Figure 7:
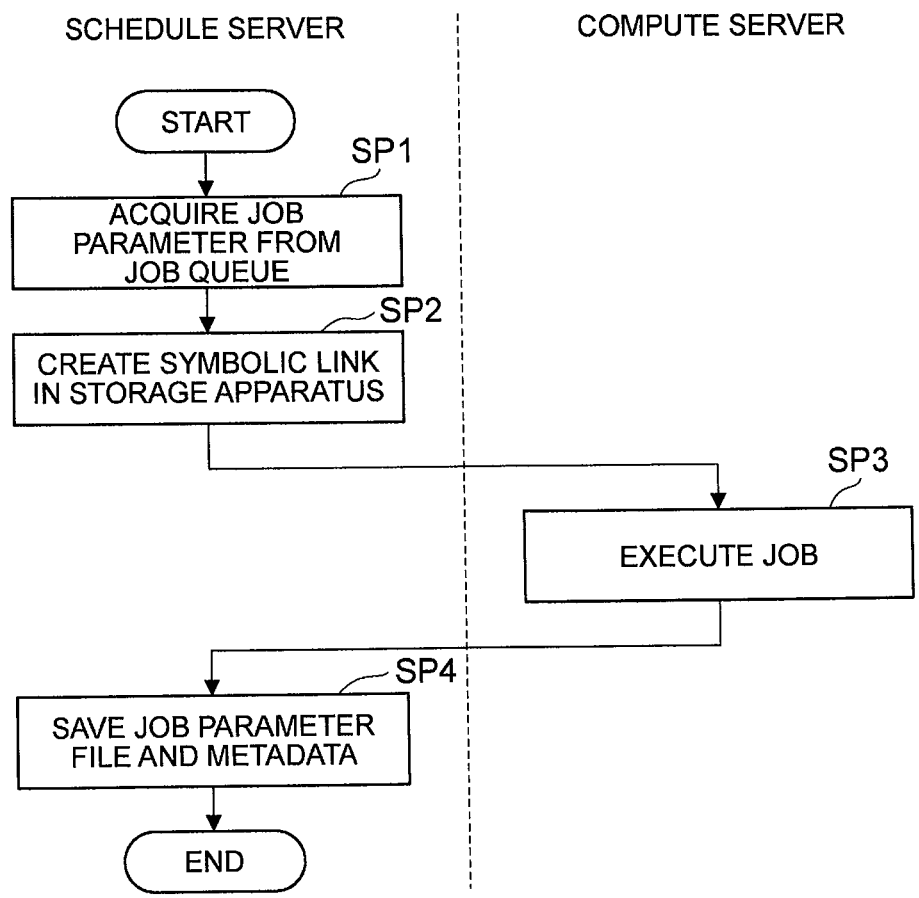
FIG. 7 is a flowchart illustrating a flow of job execution processing.

FIG. 7 illustrates a flow of processing when the computing system 7 (FIG. 1) for the cloud system 4 executes jobs of analysis processing in response to a request from the user terminal 2. In a case of this embodiment, the schedule server 9 operates a general batch queuing service and sequentially executes job commands of the analysis processing issued externally.

After the schedule server 9 schedules execution of jobs (analysis processing), the job execution processing illustrated in FIG. 7 is started and the schedule server 9 firstly fetches one job command from a job queue and acquires a job parameter from the fetched job command (SP1).

Figure 8:
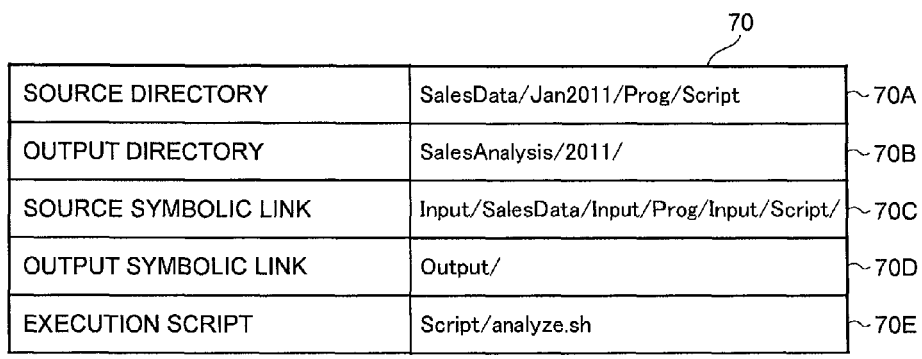
FIG. 8 is a conceptual diagram illustrating the structure of a job parameter.

The job parameter 70 includes source directory information 70A, output directory information 70B, source symbolic link information 70C, output symbolic link information 70D, and execution script information 70E as shown in FIG. 8. The source directory information 70A indicates the location of a source directory which is a storage location of the analysis target data (the primary data or the analysis data) and an execution script and the output directory information 70B indicates the location of an output directory which is a storage location of the processing result of the analysis processing (the analysis data). Moreover, the source symbolic link information 70C and the output symbolic link information 70D indicate symbolic links to the source directory or the output directory and the execution script information 70E indicates a script name of an execution script to be executed at the compute server 10 (FIG. 1). Since there is a case where the analysis is performed by using a plurality of source directories, the source directory information 70A and the source symbolic link information 70C may be a list including a plurality of directories.

Subsequently, the schedule server 9 creates the symbolic links to the source directory and the output directory (the source symbolic link and the output symbolic link), respectively, based on the acquired job parameter 70 and creates these created symbolic links in the temporary directory 51 of the corresponding file system FS in the storage apparatus 8 (SP2).

In this way, the schedule server 9 prepares for access to the relevant user data 12 and the execution script by the compute server 10. Then, the schedule server 9 issues a job execution command (hereinafter referred to as the job execution command) to the compute server 10.

After receiving the job execution command from the schedule server 9, the compute server 10 activates the execution script designated by that job execution command, refers to the corresponding symbolic links stored in the temporary directory 51 (FIG. 3) of the storage apparatus 8, and executes the job (SP3).

Specifically speaking, the compute server 10 reads the analysis target data and its corresponding execution script from a link location the corresponding source symbolic link stored in the temporary directory 51 (FIG. 3) of the storage apparatus 8, activates the read execution script, and executes the analysis processing on the analysis target data. Moreover, the compute server 10 stores analysis data, which is acquired as a result of this analysis processing, at the link location of the corresponding output symbolic link stored in the temporary directory 51.

Then, after the compute server 10 completes execution of the job, the schedule server 9 stores the job parameter 70 acquired in step SP1 and the metadata 13 of the analysis data generated by the analysis processing in step SP3 in the storage apparatus 8 (SP4).

Specifically speaking, the schedule server 9 creates a new job parameter file in the user directory 50 (FIG. 3) of the storage apparatus 8 and stores the job parameter 70 acquired in step SP1 in that job parameter file.

Moreover, the schedule server 9 creates a new metadata table 61 (FIG. 6) of the analysis data, which was generated in step SP3, in the metadata 13. When this happens, the schedule server 9 stores: "YES" in the regeneratable attribute row 61B of the metadata table 61; "NO" in the deleted attribute row 61C; "0" in the number-of-times-of-reference row 61D; a file name of the job parameter file created as described above in the job parameter file row 61F; the current time in each of the registration date and time row 61G and the final access date and time row 61H; and time required for the compute server 10 to complete the job in the job execution time row 61I.

Furthermore, the schedule server 9 checks whether the metadata 13 of the analysis target data stored in the source directory included in the job parameter 70 acquired in step SP1 exists or not. If such metadata 13 does not exist, this means that that analysis target data is the primary data and, therefore, the schedule server 9 will not do anything. On the other hand, if such metadata 13 exists, this means that the analysis target data is secondary or subsequent data (the analysis data) and, therefore, the schedule server 9 updates the final access date and time stored in the final access date and time row 61H of the metadata table 61 of the relevant analysis target data to the current time and updates the number of times of reference stored in the number-of-times-of-reference row 61D of the metadata table 61 to a numerical value increased by one.

When the above-described series of processing is completed, the schedule server 9 finishes this job execution processing.

(3-2) Automatic Deletion Processing

Figure 9:
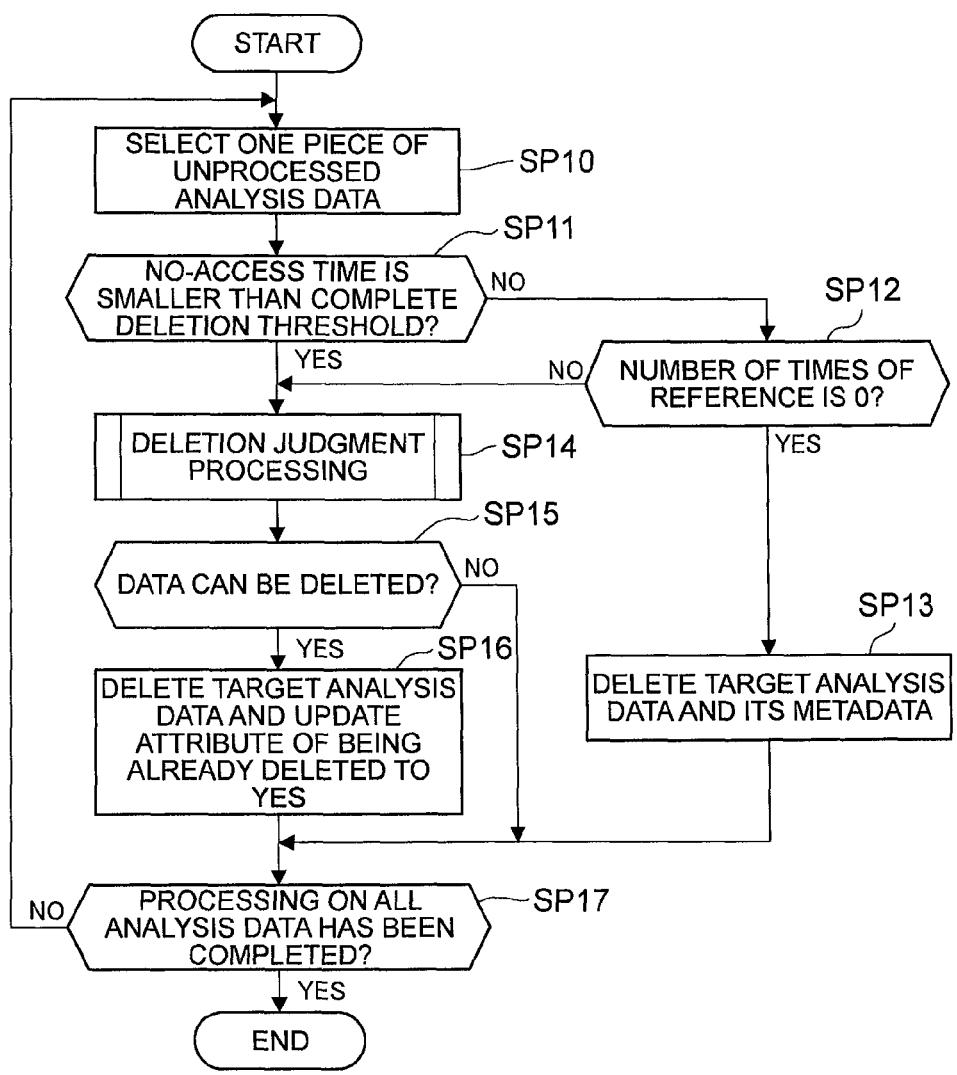
FIG. 9 is a flowchart illustrating a processing sequence for automatic deletion processing.

FIG. 9 illustrates a processing sequence for the automatic deletion processing regularly executed by the automatic deletion program 43 (FIG. 3) of the storage apparatus 8. The automatic deletion program 43 searches for the analysis data, which can be deleted, within the storage apparatus 8 and deletes the analysis data detected by the search in accordance with the processing sequence illustrated in FIG. 9.

In practice, when the automatic deletion program 43 starts this automatic deletion processing, it firstly selects one piece of unprocessed analysis data from the analysis data stored in the user directory 50 (FIG. 3) of the storage apparatus 8 (SP10).

Subsequently, the automatic deletion program 43 judges whether or not the no-access time of the analysis data selected in step SP10 (hereinafter referred to as the target analysis data) is smaller than a complete deletion no-access time threshold value which is set by a user who owns the analysis data (SP11).

Specifically speaking, the automatic deletion program 43 reads the final access date and time from the metadata table 61 (FIG. 6) of the target analysis data and calculates elapsed time from the read final access date and time to the current time as no-access time. Moreover, the automatic deletion program 43 compares the calculated no-access time with the complete deletion no-access time threshold stored in the user information table 54 (FIG. 5) of the owner of the target analysis data and judges whether or not the no-access time is smaller than the complete deletion no-access time threshold which is set by the owner of the target analysis data.

If the automatic deletion program 43 obtains a negative result for this judgment, it refers to the metadata table 61 of the target analysis data and judges whether the number of times of reference made to the target analysis data is "0" or not (SP12).

Then, if the automatic deletion program 43 obtains a negative result for this judgment, it proceeds to step SP14. On the other hand, if the automatic deletion program 43 obtains an affirmative judgment result in step SP12, it deletes the target analysis data from the user directory 50 (FIG. 3) and deletes the metadata table 61 (FIG. 6) of the target analysis data from the metadata 13 (SP13) and then proceeds to step SP17.

On the other hand, if the automatic deletion program 43 obtains an affirmative judgment result in step SP11, it invokes the deletion judgment program 44 (FIG. 3) and has it execute deletion judgment processing for judging whether a temporary deletion of the target analysis data is possible or not (SP14).

Next, the automatic deletion program 43 waits for the judgment result of such deletion judgment processing; and after receiving the judgment result from the deletion judgment program 44, the automatic deletion program 43 judges whether or not the reported judgment result indicates the deletion is possible (SP15).

If the automatic deletion program 43 obtains a negative result for this judgment, it proceeds to step SP17. On the other hand, if the automatic deletion program 43 obtains an affirmative result for this judgment, it deletes the target analysis data from the user directory 50 (FIG. 3) and changes the deleted attribute, which is stored in the deleted attribute row 61C (FIG. 6) of the metadata table 61 corresponding to the target analysis data, to "YES" (SP16).

Subsequently, the automatic deletion program 43 judges whether the execution of the processing from step SP10 to step SP16 on all the pieces of analysis data stored in the user directory 50 of the storage apparatus 8 has been completed or not (SP17).

If the automatic deletion program 43 obtains a negative result for this judgment, it returns to step SP10 and then repeats the processing from step SP10 to step SP17 until it obtains an affirmative result in step SP17.

Then, if the automatic deletion program 43 eventually obtains an affirmative result in step SP17 by completing the execution of the processing from step SP10 to step SP16 on all the pieces of analysis data stored in the user directory 50 of the storage apparatus 8, it finishes this automatic deletion processing.

(3-3) Deletion Judgment Processing

Figure 10:
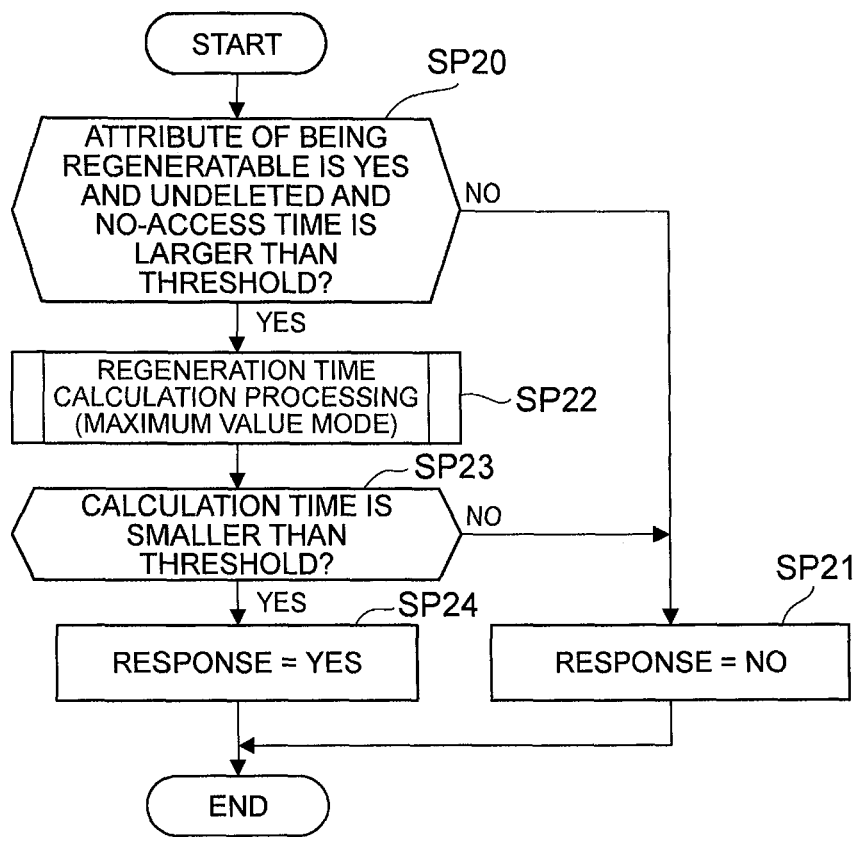
FIG. 10 is a flowchart illustrating a processing sequence for deletion judgment processing.

FIG. 10 illustrates a processing sequence for the deletion judgment processing executed by the deletion judgment program 44 invoked by the automatic deletion program 43 in step SP13 of the automatic deletion processing described above with reference to FIG. 9.

After the deletion judgment program 44 is invoked by the automatic deletion program 43, it starts the deletion judgment processing illustrated in FIG. 10 and firstly judges whether or not the target analysis data is regeneratable data and has not been deleted and the no-access time is larger than a temporary deletion no-access time threshold which is set by the owner of the target analysis data (SP20).

Specifically speaking, the deletion judgment program 44 judges whether or not the regeneratable attribute of the target analysis data in the metadata table 61 (FIG. 6) is "YES," the deleted attribute is "NO," and the no-access time which is elapsed time from the final access date and time stored in that metadata table 61 to the current time is larger than the temporary deletion no-access time threshold stored in the user information table 54 (FIG. 5) of the owner of the target analysis data.

Then, if the deletion judgment program 44 obtains a negative result for this judgment, it notifies the automatic deletion program 43 of the judgment result that the target analysis data cannot be deleted (the deletion is impossible) (SP21); and then the deletion judgment program 44 finishes this deletion judgment processing.

On the other hand, if the deletion judgment program 44 obtains an affirmative judgment result in step SP20, it invokes the regeneration time calculation program 45 and issues a command to execute regeneration time calculation processing for calculating time required to regenerate the target analysis data (hereinafter referred to as the regeneration time) in a maximum value mode (SP22). Incidentally, the details of the "maximum value mode" will be explained later.

Next, the deletion judgment program 44 waits for the processing result of such regeneration time calculation processing to be reported from the regeneration time calculation program 45; and after receiving the processing result, the deletion judgment program 44 judges whether or not the reported regeneration time is smaller than a regeneration time upper limit value stored in the relevant user information table 54 (FIG. 5) (SP23).

If the deletion judgment program 44 obtains a negative result for this judgment, it notifies the automatic deletion program 43 of the judgment result that the target analysis data cannot be deleted (the deletion is impossible) (SP21); and then the deletion judgment program 44 finishes this deletion judgment processing.

On the other hand, if the deletion judgment program 44 obtains an affirmative judgment result in step SP23, it notifies the automatic deletion program 43 of the judgment result of the deletion judgment processing that the target analysis data can be deleted (the deletion is possible) (SP24); and then the deletion judgment program 44 finishes this deletion judgment processing.

(3-4) Regeneration Time Calculation Processing

Figure 11:
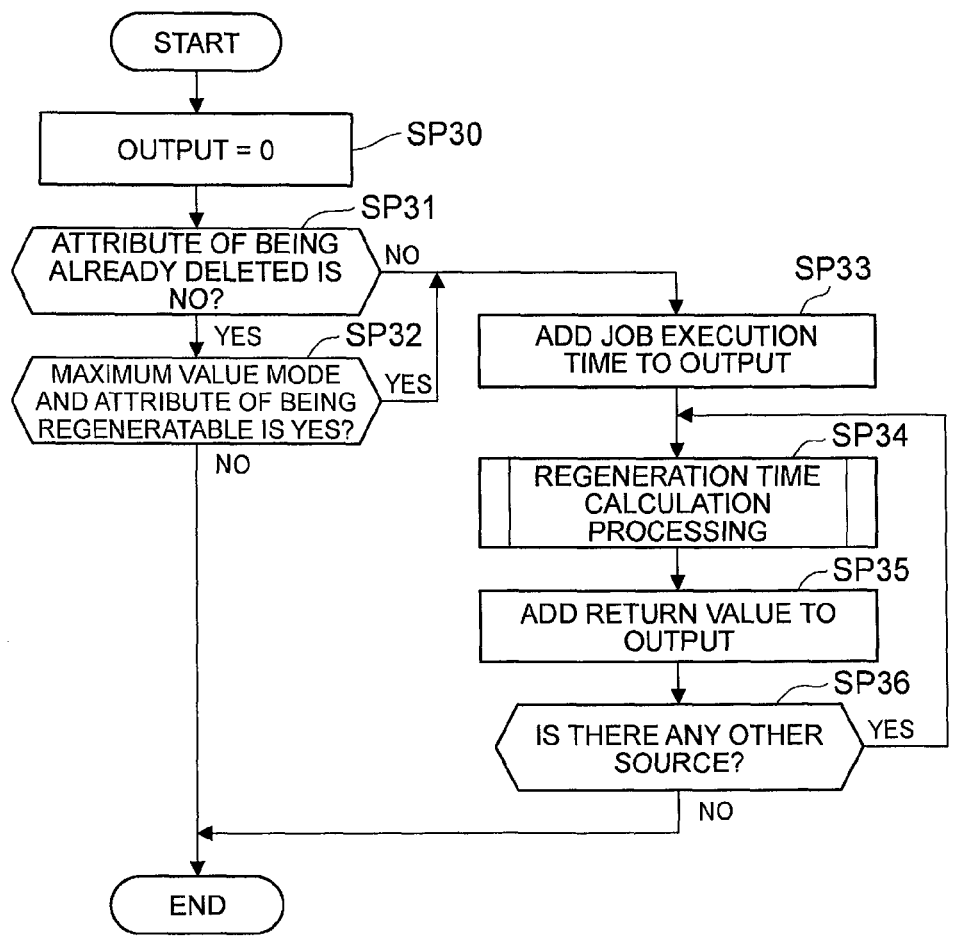
FIG. 11 is a flowchart illustrating a processing sequence for regeneration time calculation processing.

FIG. 11 illustrates a processing sequence for the regeneration time calculation processing executed by the regeneration time calculation program 45 (FIG. 3) invoked by the deletion judgment program 44 in step SP22 of the deletion judgment processing described above with reference to FIG. 10.

Now, there are two operation modes for this regeneration time calculation processing. One mode is an actual mode in which necessary calculation time actually required to regenerate only the target analysis data is calculated, while the other mode is a maximum value mode in which a maximum value of the necessary calculation time required to regenerate the target analysis data is calculated. The maximum value mode is necessary because there is a possibility that the necessary analysis data to regenerate the target analysis data may be deleted by the aforementioned automatic deletion processing. Specifically speaking, an output value of the maximum value mode becomes the time required to regenerate the target analysis data when all the pieces of necessary analysis data to regenerate the target analysis data are deleted, except the primary data.

For example, if the target analysis data is quartic data, an output value of the actual mode is time required to regenerate the quartic data when the tertiary data exists; and an output value of the maximum value mode is time required to regenerate the quartic data when all the secondary data and the tertiary data are deleted. Therefore, the output value of the maximum value mode in this case is a value calculated as a total amount of time which is a sum of time required to regenerate the secondary data from the primary data, time required to regenerate the tertiary data from the regenerated secondary data, and time required to regenerate the quartic data from the regenerated tertiary data.

Incidentally, the actual mode is a mode to calculate time required to regenerate the target analysis data from source data and the primary data which are not temporarily deleted at the time when this processing is invoked; and is used when calculating time required to regenerate the target analysis data. On the other hand, the maximum value mode is a mode to calculate time required to regenerate the target analysis data, assuming that all the pieces of regeneratable source data have been temporarily deleted; and is used when judging whether the target analysis data should be deleted or not.

Referring back to FIG. 11, when the regeneration time calculation program 45 is invoked by the deletion judgment program 44, it starts the regeneration time calculation processing shown in FIG. 11 and firstly resets the output value (set it as "0") (SP30).

Subsequently, the regeneration time calculation program 45 refers to the metadata table 61 (FIG. 6) of the target analysis data and judges whether or not the deleted attribute of the target analysis data is "NO" (whether the target analysis data has already been deleted or not) (SP31). Then, if the regeneration time calculation program 45 obtains a negative result for this judgment, it proceeds to step SP33.

On the other hand, if the regeneration time calculation program 45 obtains an affirmative judgment result in step SP31, it judges whether or not the "maximum value mode" is designated as the operation mode and the regeneratable attribute of the target analysis data is set as "YES" (SP32).

Then, if the regeneration time calculation program 45 obtains a negative result for this judgment, it notifies the deletion judgment program 44 of "0" as the processing result of the regeneration time calculation processing and then finishes this regeneration time calculation processing. Therefore, when the "actual mode" is designated as the operation mode of the regeneration time calculation processing or there is no fear that the target analysis data will be deleted in the future, "0" is output as the processing result of the regeneration time calculation processing.

On the other hand, if the regeneration time calculation program 45 obtains an affirmative judgment result in step SP31, this means that the target analysis data is not deleted now, but there is a possibility that the target analysis data might be deleted in the future. So, under this circumstance, the regeneration time calculation program 45 acquires job execution time of the target analysis data from the metadata table 61 (FIG. 6) of the target analysis data and adds the acquired job execution time to the output value (SP33).

Subsequently, the regeneration time calculation program 45 selects one piece of analysis data (analysis data of the previous order), which is the source of the currently targeted analysis data (the target analysis data in this stage), from the source directory of the metadata table 61, executes the regeneration time calculation processing as illustrated in FIG. 11 (SP34), and acquires the regeneration time of the source directory. The regeneration time calculation program 45 adds the then-acquired return value to the output value (SP35).

Furthermore, the regeneration time calculation program 45 checks whether or not another directory is registered in the source directory of the metadata table 61 (SP36); and then executes steps SP34 and SP35 on all the source directories. Then, if the regeneration time calculation program 45 obtains a negative result for this judgment, it returns to step SP34 and then repeats the processing from step SP34 to step SP36. Incidentally, the processing from step SP34 to step SP36 is repeated until the analysis data which is the source of the then targeted analysis data can no longer be regenerated.

In this way, it is possible to calculate the maximum time required to regenerate the target analysis data by accumulatively and recursively adding the regeneration time of the analysis data including the target analysis data, the analysis data which is the source of the target analysis data, and analysis data which is a further source of the relevant analysis data, and so on.

Then, if the regeneration time calculation program 45 eventually obtains an affirmative result in step SP36, it notifies the deletion judgment program 44 of the output value at that time as the processing result of the regeneration time calculation processing and then finishes this regeneration time calculation processing.

(3-5) User Data Regeneration Processing

Figure 12:
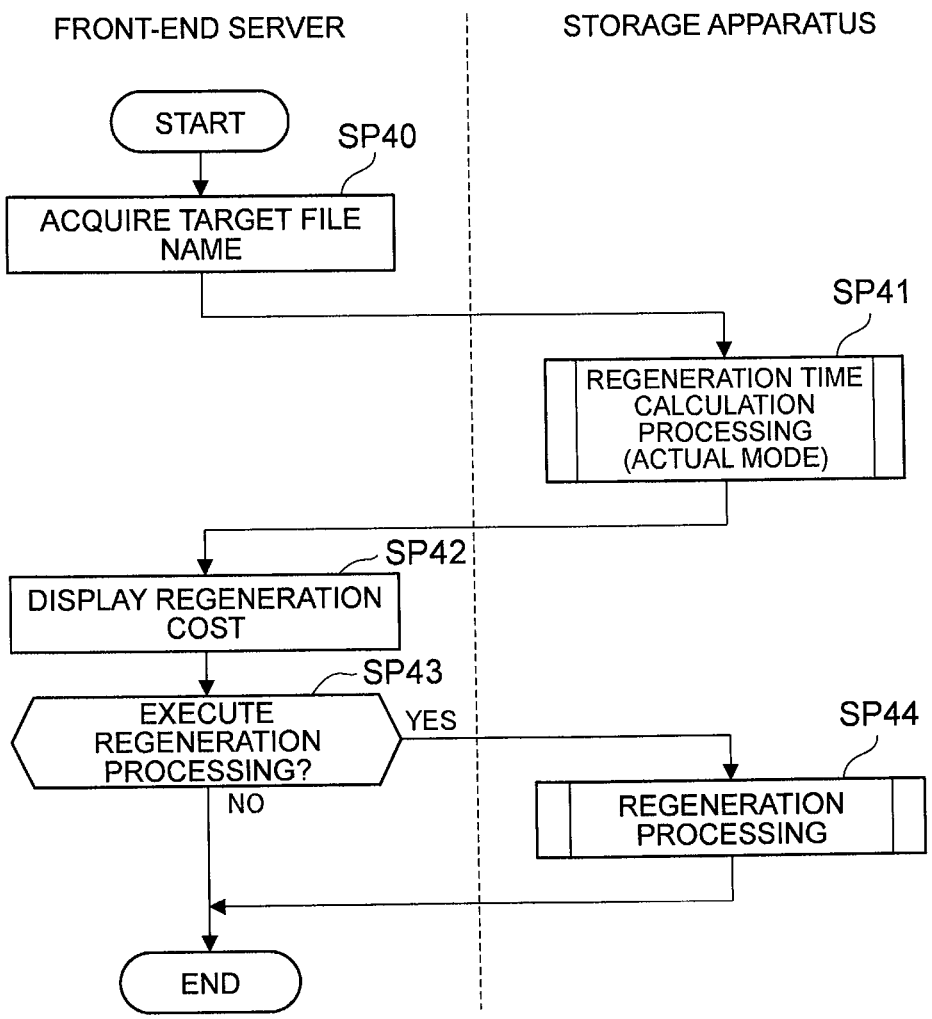
FIG. 12 is a flowchart illustrating a processing sequence for user data regeneration processing.

FIG. 12 illustrates a flow of processing within the cloud system 4 when a regeneration command targeted on certain analysis data is sent from the user terminal 2 to the cloud system 4.

After receiving such a regeneration job command, the front-end server 6 for the cloud system 4 acquires a file name of the analysis data designated in the relevant regeneration command (hereinafter referred to as the regeneration target analysis data) and sends the regeneration command including the acquired file name to the storage apparatus 8 (SP40).

Having received the regeneration command, the storage apparatus 8 calculates the time required to regenerate the regeneration target analysis data (hereinafter referred to as the data regeneration time) by executing the regeneration time calculation processing described with reference to FIG. 11 in the "actual mode", and sends the calculated data regeneration time to the front-end server 6 (SP41).

The front-end server 6 which has received this user data regeneration time sends that data regeneration time to the user terminal 2 which is a sender of the regeneration command (SP42). Consequently, the user terminal 2 displays the data regeneration time and asks the user to decide whether or not to regenerate the regeneration target analysis data which is the target at that time. Moreover, the user terminal 2 sends the decision result input by the user as user decision result information to the front-end server 6.

Then, the front-end server 6 judges based on the user decision result information whether or not the user's decision result of whether to regenerate the regeneration target analysis data or not indicates the execution of regeneration (SP43). Then, if the front-end server 6 obtains a negative result for this judgment, it finishes the processing in response to the aforementioned regeneration command. As a result, a series of processing at the cloud system 4 is terminated.

On the other hand, if the front-end server 6 obtains an affirmative judgment result in step SP43, it sends a regeneration processing execution command to regenerate the regeneration target analysis data (hereinafter referred to as the regeneration processing execution command) to the storage apparatus 8. Then, after receiving the regeneration processing execution command, the storage apparatus 8 executes the regeneration processing for regenerating the regeneration target analysis data designated by this regeneration processing execution command and the front-end server 6 sends the completion of regeneration to the user terminal 2 which is the requestor (SP44). A transmission method to be used is a method of, for example, displaying the information on a screen of the user terminal or sending e-mail to the user. As a result, a series of processing at the cloud system 4 is terminated. The user can download data from the storage apparatus 8 by requesting data acquisition from the front-end server 6 again.

(3-6) Regeneration Processing

Figure 13:
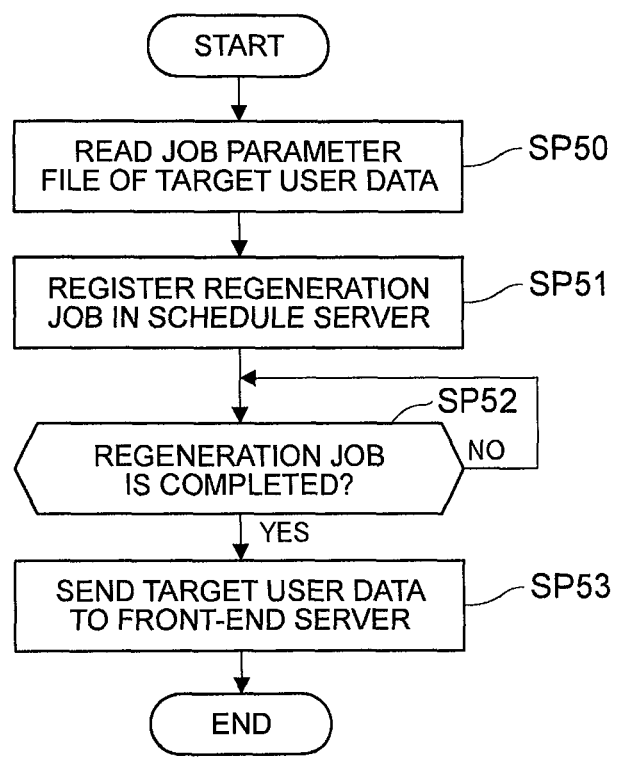
FIG. 13 is a flowchart illustrating a processing sequence for regeneration processing.

FIG. 13 illustrates a processing sequence for the regeneration processing executed by the regeneration program 46 (FIG. 3) of the storage apparatus 8 in step SP44 of the processing described above with reference to FIG. 12.

After receiving the regeneration processing execution command sent from the front-end server 6 in step SP43 of FIG. 12, the regeneration program 46 starts the regeneration processing illustrated in FIG. 13 and firstly reads the job parameter 70 of the regeneration target analysis data (SP50).

Subsequently, the regeneration program 46 generates a job command to request processing for analyzing the primary data or the analysis data, which is the source of the regeneration target analysis data, based on the job parameter 70 read in step SP50. Incidentally, the data format of the then generated job command is the same as that of an analysis processing job command sent from the user terminal 2 to the cloud system 4. Then, the regeneration program 46 sends the generated job command to the schedule server 9 (SP51).

As a result, the job command is registered in a job queue of the schedule server 9 and then read from the job queue and sent to any one of the compute servers 10. Then, the compute server 10 which has received this job command executes the processing for regenerating the regeneration target analysis data.

On the other hand, when the regeneration program 46 sends such a job command to the schedule server 9, it then waits for any one of the compute servers 10 to regenerate the regeneration target analysis data (SP52).

Then, when any one of the compute servers 10 regenerates the regeneration target analysis data, the regeneration program 46 sends the completion of regeneration to the relevant user terminal 2 via the front-end server 6 (SP53) and then finishes this regeneration processing.

(4) Advantageous Effects of this Embodiment

When regarding the data analysis system according to this embodiment described above analysis data which satisfies a specified condition, for example, when the no-access time of the target analysis data is larger than a threshold value (the temporary deletion no-access time threshold or the complete deletion no-access time threshold) or when the time required to regenerate the analysis data is smaller than the regeneration time upper limit value, such data is regularly deleted from the storage apparatus 8. So, it is possible to efficiently reduce the data amount of the analysis data stored in the storage apparatus 8 and eventually the data amount stored in the storage apparatus 8. Therefore, it is possible to effectively make use of storage areas (storage resources) provided by the storage devices 20.

(5) Other Embodiments

Incidentally, the aforementioned embodiment has described the case where the present invention is applied to the data analysis system 1 configured as illustrated in FIG. 1; however, the present invention is not limited to this example and can be applied to a wide variety of other kinds of data analysis systems. For example, there may be a plurality of storage apparatuses 8 instead of one storage apparatus 8 and the schedule server 9 and the compute server 10 may be configured in an integrated manner.

Furthermore, the aforementioned embodiment has described the case where the automatic deletion program 43 regularly executes the automatic deletion processing described earlier with reference to FIG. 9; however, the present invention is not limited to this example and the automatic deletion program 43 may irregularly execute the automatic deletion processing. For example, the automatic deletion processing may be executed in accordance with a command from the user.

Furthermore, the aforementioned embodiment has described the case where the storage configuration table 53 is structured as illustrated in FIG. 4, the user information table 54 is structured as illustrated in FIG. 5, and the metadata 13 is structured as illustrated in FIG. 6; however, the present invention is not limited to this example and a wide variety of other structures can be applied to the storage configuration table 53, the user information table 54, and the metadata 13. For example, a computer different from the storage apparatus may be used to operate a database for managing the metadata and the data unit for managing the metadata may be files instead of directories.

Furthermore, the aforementioned embodiment has described the case where the condition, for example, the no-access time of the target analysis data is larger than the threshold value (the temporary deletion no-access time threshold or the complete deletion no-access time threshold), the time required to regenerate the analysis data is smaller than the regeneration time upper limit value, and the relevant analysis data is not required to regenerate other analysis data are applied as the specified condition to delete the analysis data from the storage apparatus 8; however, the present invention is not limited to this example and a wide variety of other conditions can be applied. For example, the temporary deletion no-access time threshold may be set individually according to a file extension or a file size. Moreover, the temporary deletion no-access time threshold, the complete deletion regeneration time, and the upper limit no-access time threshold are set for each user in this embodiment, but they may be set for each file.

Furthermore, in the aforementioned embodiment, the primary data will not be deleted when the secondary data exists. However, even in the above-described case, the primary data may be deleted; and furthermore, the primary data may be deleted by the user's selection. In this embodiment, as a general rule, the primary data will not be deleted when the secondary data and subsequent data exist; and as a result, the regeneratable attribute will not be changed from "YES" to "NO." However, if the deletion of the primary data is permitted, the regeneratable attribute may be changed from "YES" to "NO."

Furthermore, in the aforementioned embodiment, the regeneratable attribute of the secondary data is set as "YES" when the secondary data is generated; however, when the primary data can be reversibly regenerated from the secondary data, the regeneratable attribute of the primary data is set as "YES" when generating the secondary data. In this case, if the secondary data is deleted and the primary data cannot be regenerated from other secondary data or tertiary data, the regeneratable attribute of the primary data is changed from "YES" to "NO."

INDUSTRIAL APPLICABILITY

The present invention can be applied to, for example, a data analysis system for performing the big data analysis.

REFERENCE SIGNS LIST

1 data analysis system; 2 user terminal; 4 cloud service; 6 front-end server; 7 computer system; 8 storage apparatus; 9 schedule server 9 compute server; 12 user data; 13 metadata; 22 control unit; 20 storage device; 29 processor; 30 main memory; 43 automatic deletion program; 44 deletion judgment program; 45 regeneration time calculation program; 46 regeneration program; 53 storage configuration table; and 54 user information table.

The invention claimed is:

1. A storage apparatus storing primary data and analysis data obtained by executing specified processing on the primary data, the storage apparatus comprising:

one or more storage devices storing the primary data, the analysis data, and metadata for each piece of the analysis data, the metadata storing management information about the analysis data, wherein the analysis data is secondary data generated as a result of analysis processing on the primary data by an external computing system connected to the storage apparatus; and a control unit for controlling inputting and outputting of the primary data and the analysis data to and from the one or more storage devices, wherein the control unit has a memory, the memory storing a first threshold indicating a value of time of when a piece of analysis data is not accessed and an upper limit time value indicating a maximum amount of time that is required to regenerate a piece of analysis data, wherein the metadata for each piece of the analysis data includes;

regeneration information indicating whether the corresponding analysis data is able to be regenerated, job execution time information indicating a time required to regenerate only the corresponding analysis data by the external computer system, deletion information indicating whether the corresponding analysis data has been deleted, access time information indicating the last time the corresponding analysis data was accessed, wherein the control unit further includes a processor connected to the memory, the memory storing instructions that when executed by the processor, cause the processor to:

select analysis data, by referring to the corresponding metadata of the analysis data, which satisfies one of:

an elapsed time from the last time the corresponding analysis data was accessed is greater than the first threshold value, and the job execution time information indicating the time required to regenerate only the corresponding data analysis data is less than the upper limit time value, and that satisfies that the regeneration information indicates that the corresponding analysis data is able to be regenerated, delete the selected analysis data from one or more storage devices, and when a regeneration request to regenerate the deleted analysis data is issued to the control unit, request the external computing system to execute analysis processing for regenerating the analysis data and send the analysis data regenerated by the analysis processing to a requestor of the regeneration request.

2. The storage apparatus according to claim 1, wherein the memory of the control unit further stores: a second threshold value which is larger than the first threshold value is set in advance as a threshold value of time of when a piece of analysis data is not accessed, and instructions that when executed by the processor, cause the processor to, when, by referring to the access time information of the metadata corresponding to a piece of analysis data, the time elapsed from the last time the corresponding analysis data was accessed is greater than the second threshold value, deletion of the analysis data as well as the metadata for that analysis data from the one or more storage devices.

3. A data management method for managing analysis data obtained by executing specified processing on primary data in a storage apparatus storing the primary data and the analysis data, wherein the storage apparatus includes:

one or more storage devices storing the primary data, the analysis data, and metadata for each piece of the analysis data, the metadata storing management information about the analysis data, wherein the analysis data is secondary data generated as a result of analysis processing on the primary data by an external computing system connected to the storage apparatus; and a control unit for controlling inputting and outputting of the primary data and the analysis data to and from the one or more storage devices, wherein the control unit has a memory, the memory storing a first threshold indicating a value of time of when a piece of analysis data is not accessed and an upper limit time value indicating a maximum amount of time that is required to regenerate a piece of analysis data wherein the metadata for each piece of the analysis data includes:

regeneration information indicating whether the corresponding analysis data is able to be regenerated, job execution time information indicating a time required to regenerate only the corresponding analysis data by the external computer system, deletion information indicating whether the corresponding analysis data has been deleted, access time information indicating the last time the corresponding analysis data was accessed, wherein the data management method comprises:

a first step executed by the control unit of selecting analysis data, by referring to the corresponding metadata of the analysis data, which satisfies one of:

an elapsed time from the last time the corresponding analysis data was accessed is greater than the first threshold value, and the job execution time information indicating the time required to regenerate only the corresponding data analysis data is less than the upper limit time value, and that satisfies that the regeneration information indicates that the corresponding analysis data is able to be regenerated, a second step executed by the control unit of deleting the selected analysis data from one or more storage devices, and a third step of when a regeneration request to regenerate the deleted analysis data is issued to the control unit, request the external computing system to execute analysis processing for regenerating the analysis data and send the analysis data regenerated by the analysis processing to a requestor of the regeneration request.

4. The data management method according claim 3, wherein the memory of the control unit further stores a second threshold value which is larger than the first threshold value is set in advance as a threshold value of time of when a piece of analysis data is not accessed, wherein in the second step, when time elapsed from the last time the corresponding analysis data was accessed is greater than the second threshold value, the control unit deletes the analysis data as well as the metadata for that analysis data from the one or more storage devices.

* * * * *